(12) United States Patent
Tindal et al.

(10) Patent No.: US 7,313,625 B2
(45) Date of Patent: Dec. 25, 2007

(54) DYNAMIC CONFIGURATION OF NETWORK DEVICES TO ENABLE DATA TRANSFERS

(75) Inventors: Glen Tindal, Colorado Springs, CO (US); Jeffery A. Schenk, Cambria, CA (US)

(73) Assignee: Intelliden, Inc., Colorado Springs, CO (US)

( * ) Notice: Subject to any disclaimer, the term of this patent is extended or adjusted under 35 U.S.C. 154(b) by 16 days.

(21) Appl. No.: 11/273,293

(22) Filed: Nov. 14, 2005

(65) Prior Publication Data

US 2006/0080434 A1 Apr. 13, 2006

Related U.S. Application Data

(63) Continuation of application No. 09/730,671, filed on Dec. 6, 2000, now Pat. No. 7,054,946.

(51) Int. Cl.
*G06F 15/16* (2006.01)

(52) U.S. Cl. ..................... 709/228; 709/227

(58) Field of Classification Search ............... None
See application file for complete search history.

(56) References Cited

U.S. PATENT DOCUMENTS

| | | | |
|---|---|---|---|
| 5,506,966 A | 4/1996 | Ban | |
| 5,535,335 A | 7/1996 | Cox | |
| 5,659,746 A | 8/1997 | Bankert | |
| 5,680,551 A | 10/1997 | Martin | |
| 5,732,078 A * | 3/1998 | Arango | 370/355 |
| 5,751,965 A | 5/1998 | Mayo | |
| 5,812,768 A | 9/1998 | Page | |
| 5,819,042 A | 10/1998 | Hansen | |
| 5,878,432 A | 3/1999 | Misheski | |
| 5,889,943 A | 3/1999 | Ji | |
| 5,901,320 A | 5/1999 | Takahashi | |
| 5,920,701 A * | 7/1999 | Miller et al. | 709/228 |
| 5,923,850 A | 7/1999 | Barroux | |
| 5,956,341 A * | 9/1999 | Galand et al. | 370/412 |
| 5,999,948 A | 12/1999 | Nelson | |
| 6,014,697 A | 1/2000 | Lewis | |
| 6,085,253 A | 7/2000 | Blackwell | |
| 6,088,804 A | 7/2000 | Hill | |

(Continued)

FOREIGN PATENT DOCUMENTS

EP 745929 A1 12/1996

(Continued)

OTHER PUBLICATIONS

Noms, IEEE 1992 Network Operations and Management Symposium, 1992, vol. 1, IEEE Communications Society, NewYork, USA.

(Continued)

*Primary Examiner*—Kenny Lin
(74) *Attorney, Agent, or Firm*—Cooley, Godward Kronish LLP

(57) ABSTRACT

A system and method for optimizing the use of network resources is described. In one embodiment, an enterprise first requests provisioning of network resources for a particular transaction. Responsive to that request, network resources are dynamically configured to meet the enterprise's request. When the transaction is complete, the network resources are returned to a default state.

21 Claims, 5 Drawing Sheets

U.S. PATENT DOCUMENTS

| | | | |
|---|---|---|---|
| 6,173,312 B1 | 1/2001 | Atarashi | |
| 6,211,877 B1 | 4/2001 | Steele | |
| 6,226,654 B1 | 5/2001 | Van Hoff | |
| 6,240,458 B1 | 5/2001 | Gilbertson | |
| 6,243,815 B1 | 6/2001 | Antur | |
| 6,247,049 B1 | 6/2001 | Scott | |
| 6,253,240 B1 | 6/2001 | Axberg | |
| 6,260,072 B1 * | 7/2001 | Rodriguez-Moral | 709/241 |
| 6,272,526 B1 | 8/2001 | Robinson | |
| 6,286,038 B1 | 9/2001 | Reichmeyer | |
| 6,338,149 B1 | 1/2002 | Ciccone | |
| 6,363,421 B2 | 3/2002 | Barker | |
| 6,370,119 B1 * | 4/2002 | Basso et al. | 370/252 |
| 6,374,293 B1 | 4/2002 | Dev | |
| 6,426,959 B1 | 7/2002 | Jacobson | |
| 6,449,646 B1 | 9/2002 | Sikora | |
| 6,453,255 B1 | 9/2002 | Smorodinsky | |
| 6,466,580 B1 | 10/2002 | Leung | |
| 6,470,453 B1 | 10/2002 | Vilhuber | |
| 6,473,775 B1 | 10/2002 | Kusters | |
| 6,496,858 B1 | 12/2002 | Frailong | |
| 6,546,416 B1 | 4/2003 | Kirsch | |
| 6,564,056 B1 | 5/2003 | Fitzgerald | |
| 6,571,285 B1 | 5/2003 | Groath | |
| 6,598,177 B1 | 7/2003 | Jones | |
| 6,615,218 B2 | 9/2003 | Mandal | |
| 6,628,304 B2 | 9/2003 | Mitchell | |
| 6,643,289 B1 | 11/2003 | Natanson | |
| 6,678,370 B1 | 1/2004 | Freebersyser | |
| 6,684,241 B1 | 1/2004 | Sandick | |
| 6,725,262 B1 | 4/2004 | Choquier | |
| 6,725,264 B1 | 4/2004 | Christy | |
| 6,732,175 B1 | 5/2004 | Abjanic | |
| 6,738,910 B1 | 5/2004 | Genty | |
| 6,760,761 B1 | 7/2004 | Sciacca | |
| 6,760,767 B1 | 7/2004 | Miesbauer | |
| 6,766,369 B1 | 7/2004 | Haitsuka | |
| 6,772,206 B1 | 8/2004 | Lowry | |
| 6,782,474 B1 | 8/2004 | Ylonen | |
| 6,810,427 B1 | 10/2004 | Cain | |
| 6,816,897 B2 | 11/2004 | McGuire | |
| 6,816,907 B1 * | 11/2004 | Mei et al. | 709/229 |
| 6,832,247 B1 | 12/2004 | Cochran | |
| 6,834,298 B1 | 12/2004 | Singer | |
| 6,847,994 B1 | 1/2005 | Akimoto | |
| 6,865,673 B1 | 3/2005 | Nessett | |
| 6,895,431 B1 | 5/2005 | Bero | |
| 6,895,588 B1 | 5/2005 | Ruberg | |
| 6,907,572 B2 | 6/2005 | Little | |
| 6,931,016 B1 | 8/2005 | Andersson | |
| 6,931,444 B2 | 8/2005 | Schweitzer | |
| 6,938,079 B1 | 8/2005 | Anderson | |
| 6,959,332 B1 | 10/2005 | Zavalkovsky | |
| 6,978,301 B2 | 12/2005 | Tindal | |
| 6,990,591 B1 | 1/2006 | Pearson | |
| 7,003,560 B1 | 2/2006 | Mullen | |
| 7,016,955 B2 | 3/2006 | Martin | |
| 7,127,526 B1 | 10/2006 | Duncan | |
| 7,145,871 B2 | 12/2006 | Levy | |
| 2001/0034771 A1 | 10/2001 | Hutsch | |
| 2001/0053991 A1 | 12/2001 | Bonabeau | |
| 2002/0007411 A1 | 1/2002 | Shaked | |
| 2002/0032775 A1 | 3/2002 | Venkataramaiah | |
| 2002/0032871 A1 | 3/2002 | Malan | |
| 2002/0052719 A1 | 5/2002 | Alexander | |
| 2002/0069143 A1 | 6/2002 | Cepeda | |
| 2002/0072956 A1 | 6/2002 | Willems | |
| 2002/0078068 A1 | 6/2002 | Krishnaprasad | |
| 2002/0078382 A1 | 6/2002 | Sheikh | |
| 2002/0143927 A1 | 10/2002 | Maltz | |
| 2002/0161863 A1 | 10/2002 | McGuire | |
| 2002/0169858 A1 | 11/2002 | Bellinger | |
| 2002/0173997 A1 | 11/2002 | Menard | |
| 2002/0194289 A1 | 12/2002 | Engel | |
| 2003/0016685 A1 | 1/2003 | Berggreen | |
| 2003/0018702 A1 | 1/2003 | Broughton | |
| 2003/0018765 A1 | 1/2003 | Muhlestein | |
| 2003/0061312 A1 | 3/2003 | Bodner | |
| 2003/0065919 A1 | 4/2003 | Albert | |
| 2003/0084009 A1 | 5/2003 | Bigus | |
| 2003/0135547 A1 | 7/2003 | Kent | |
| 2003/0158894 A1 | 8/2003 | Ziserman | |
| 2003/0187964 A1 | 10/2003 | Sage | |
| 2003/0200459 A1 | 10/2003 | Seeman | |
| 2004/0001493 A1 | 1/2004 | Cloonan | |
| 2004/0015592 A1 | 1/2004 | Selgas | |
| 2004/0024736 A1 | 2/2004 | Sakamoto | |

FOREIGN PATENT DOCUMENTS

| | | |
|---|---|---|
| EP | 0952521 A2 | 10/1999 |
| JP | 8139757 A | 5/1996 |

OTHER PUBLICATIONS

HP OpenView for Windows Workgroup Node Manager User Guide, 3COM, Jan. 1997, Part No. 09-1114-000, Hewlett-Packard Co., Santa Clara, CA USA.

Administrator's Guide, Formulator 3.0, 2000-2002, Gold Wire Technology Inc.

User Guide, Formulator 1.0, 2000-2001, Gold Wire Technology Inc.

Superstack II Hub TR Network Management Module Installation Guide, 3COM Jan. 1997, Hewlett-Packard Co., Santa Clara, CA USA.

Initially Configuring the ATM Switch Router, Cisco, Oct. 19, 2000, pp. 1-42.

Common Information Model—A Developer's Perspective, IEEE, 1998, p. 1.

Liu, Stephen, Cisco IOS Command Line Interface Tutorial, 1997, Small/Medium Business Solutions, www.cisco.com/warp/cpropub/45/tutorial.htm.

Yeong et al., Lightweight Directory Access Protocol, RFC 1487, Jul. 1993.

* cited by examiner

DYNAMIC CONFIGURATION OF NETWORK DEVICES TO ENABLE DATA TRANSFERS

PRIORITY

The present application is a continuation of commonly owned and assigned application Ser. No. 09/730,671 filed on Dec. 6, 2000 now U.S. Pat. No. 7,054,946, entitled Dynamic Configuration of Network Devices to Enable Data Transfer, which is incorporated herein by reference.

RELATED APPLICATIONS

The following commonly owned and assigned patent applications are hereby incorporated by reference in their entirety:
1) patent application Ser. No. 09/730,864, entitled System and Method for Configuration, Management and Monitoring of Network Resources, filed on Dec. 6, 2000;
2) patent application Ser. No. 09/730,680, entitled System and Method for Redirecting Data Generated by Network Devices, filed on Dec. 6, 2000;
3) patent application Ser. No. 09/730,863, entitled Event Manager for Network Operating System, filed on Dec. 6, 2000;
4) patent application Ser. No. 10/213,949, entitled Network Component Configuration and Management Method, filed on Dec. 6, 2000; and
5) patent application Ser. No. 09/730,682, entitled Network Operating System Data Directory, filed on Dec. 6, 2000.

FIELD OF THE INVENTION

The present invention relates generally to network systems. More particularly, but not by way of limitation, the present invention relates to systems and methods for dynamic configuration of network devices to thereby enable efficient data transfers.

BACKGROUND OF THE INVENTION

Data and the effective, timely movement of data has become the lifeblood of many modern enterprises. Unfortunately, network infrastructure limitations are impinging upon the ability of enterprises to timely move data. Enterprises that require data to be delivered within very strict time requirements are being most severely impacted by these network infrastructure limitations. To guarantee the timely delivery of their data, these enterprise often are forced to pay steep prices. Moreover, network providers are being forced continually to upgrade their infrastructure to supply even the basic services to their customers. Accordingly, the networking community is searching for a method and system to better and more economically utilize the existing network infrastructure, thereby improving the transfer of data and reducing the associated cost.

With regard to the actual transmission of data, enterprises are searching for a way to pay only for the bandwidth that they use. In essence, they are looking to optimize the use of bandwidth. Presently, an enterprise that requires the bandwidth provided, for example, by a T1 line may be forced to rent a dedicated T1 line for an entire month even though the enterprise may only need the T1 line for a few days within that month. Renting the T1 line for such an extended period is wasteful on two fronts. First, the enterprise is paying for many days of service that it does not use. Preferably, an enterprise should only pay for the service that it actually uses. Second, the bandwidth available on the T1 line for those unused days is wasted because other enterprises do not have access to it. If this unused bandwidth can be captured and made available to other enterprises, the existing network infrastructure can be better utilized to meet the demands of more enterprises. Unfortunately, no device or method exists to effectively optimize the provisioning of bandwidth. Thus, even though dedicated lines are expensive and cumbersome, companies requiring rapid, predictable transfer of data presently have no other acceptable option.

With regard to the actual routing of data, enterprises are searching for an efficient way to route data based upon priority. Several methods have been developed to aid in routing data based upon priority. These present methods, however, are not completely satisfactory. For example, a feature called weighted fair queuing can be enabled on modern routers. This feature requires that the router read a precedence bit from each packet being passed through the router and then queue lower priority packets while routing higher priority packets. Although weighted fair queuing can be effective, it requires a great deal of processing power and memory within each router, and when enabled for a long period of time, weighted fair queuing can cause a router to crash. Additionally, because weighted fair queuing requires a router to analyze each packet that it receives, it slows the overall operation of the router and, thus, the network.

Because router configuration is a somewhat complicated and time consuming process, especially if numerous routers are involved, network administrators tend to configure routers in the network either to use weighted fair queuing at all times or not to use weighted fair queuing at all. In reality, most network administrators would like to use weighted fair queuing some of the time and disable it the rest of the time. Unfortunately, selectively enabling and disabling weighted fair queuing is so cumbersome that it cannot be effectively implemented. Accordingly, a device and method are needed to selectively enable router optimization techniques such as weighted fair queuing.

Because the present network technology suffers from significant drawbacks, a solution is needed that can efficiently and effectively optimize a network to enable a more efficient transfer of data. In particular, a system and method are needed in which both the bandwidth usage and/or the router performance can be easily optimized. Such a system and method would not only address the needs of the network community, but also provide new advantages such as content transfer optimization.

SUMMARY OF THE INVENTION

To address the problems and limitations of present network technology, the present invention provides for an efficient, effective optimization of a network to enable data transfers. In particular, but not by way of limitation, the present invention provides a method and apparatus to optimize bandwidth usage, routing performance and content delivery.

In one embodiment, for example, a network provider (or manager) can receive a request to transfer a block of data between two points. Such a request could indicate the identity of the party requesting the transfer and the volume of data to be transferred. The network provider could then identify the services to which the requesting party is entitled. For example, the network provider could determine whether the data block should be transferred with a high priority, a medium priority, or a low priority.

After the network provider has determined the appropriate level of service to assign to the data transfer, it can identify the path and associated network devices for transferring the data. Next, using a system in accordance with the present invention, the network devices along that path can be dynamically configured to handle the data transfer within the appropriate service level. For example, priority data handling features (such as weighted fair queuing) can be enabled on the appropriate routers. Additionally, or even alternatively, a virtual, dedicated line between the two transfer points can be established by reconfiguring the appropriate optical devices. Once the data transfer has been completed, the priority data handling features can be disabled and/or the virtual dedicated line between the two points can be torn down.

Accordingly, in the above-described embodiment, network resources can be provisioned "just-in-time." Moreover, when network resources are not being used, they can be returned to the pool of available resources, and when special data handling features such as weighted fair queuing are not needed, they can be turned off.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
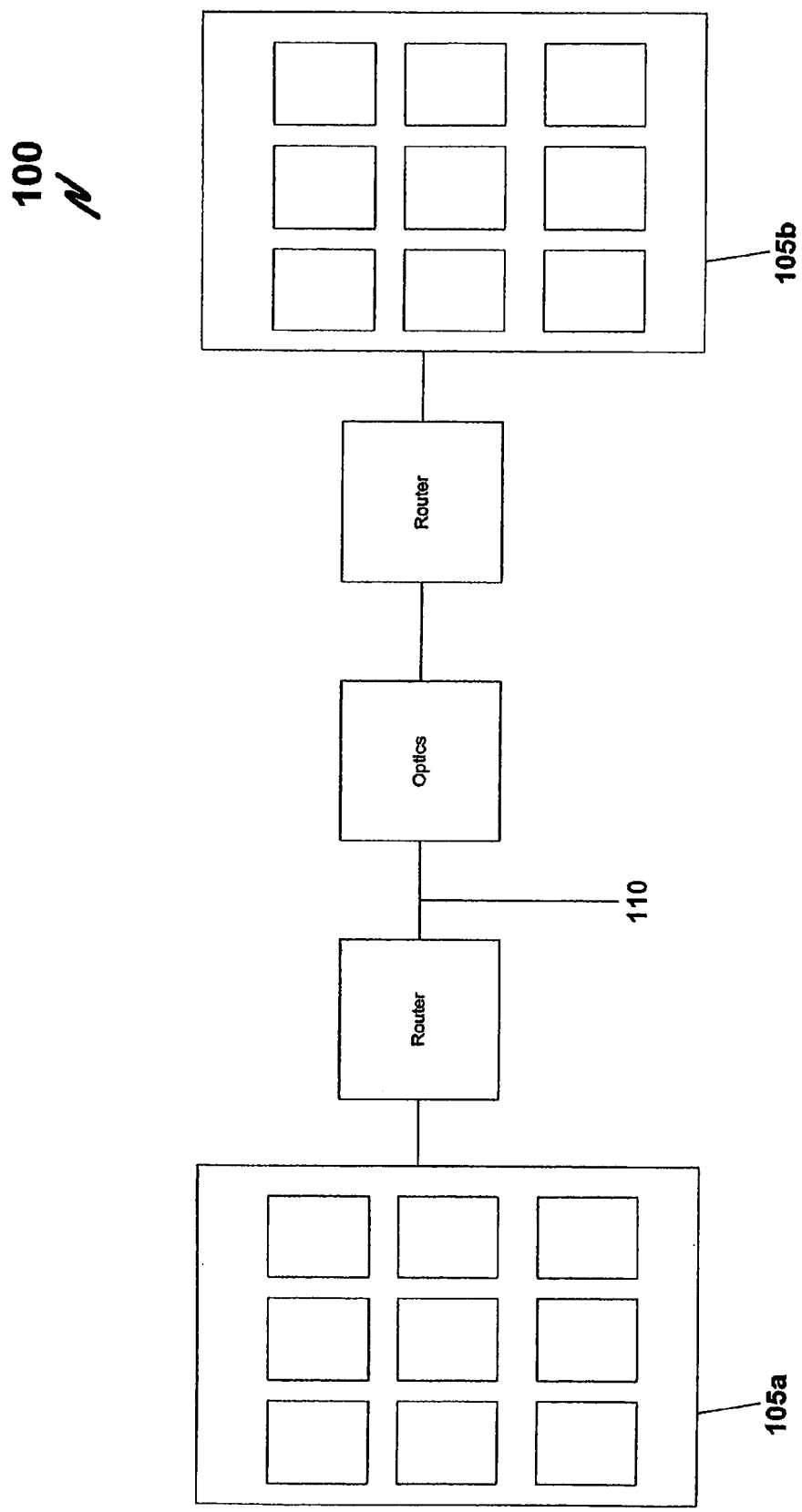
FIG. 1 illustrates a present network system connecting portions of an enterprise with a dedicated line.

Although the present invention is open to various modifications and alternate constructions, a preferred exemplary embodiment that is shown in the drawings is described herein in detail. It is to be understood, however, that there is no intention to limit the invention to the particular forms disclosed. One skilled in the art can recognize that there are numerous modifications, equivalents and alternative constructions that fall within the spirit and scope of the invention as expressed in the claims.

Referring now to FIG. 1, there is illustrated a present network system 100 connecting two portions of an enterprise (105$a$ and 105$b$) with a statically defined, dedicated line 110. As previously discussed, the enterprise may be forced to rent the dedicated line 110 for an entire month even if the line 110 is only used for a few days of that month. Thus, the line 110 (or at least the provisioned portion of the line 110) can sit idle for the majority of the time. Obviously, by allowing the line 110 to sit idle, valuable network resources that other enterprises could utilize are wasted, and the enterprise renting the line is forced to pay for services that it is not using.

Figure 2:
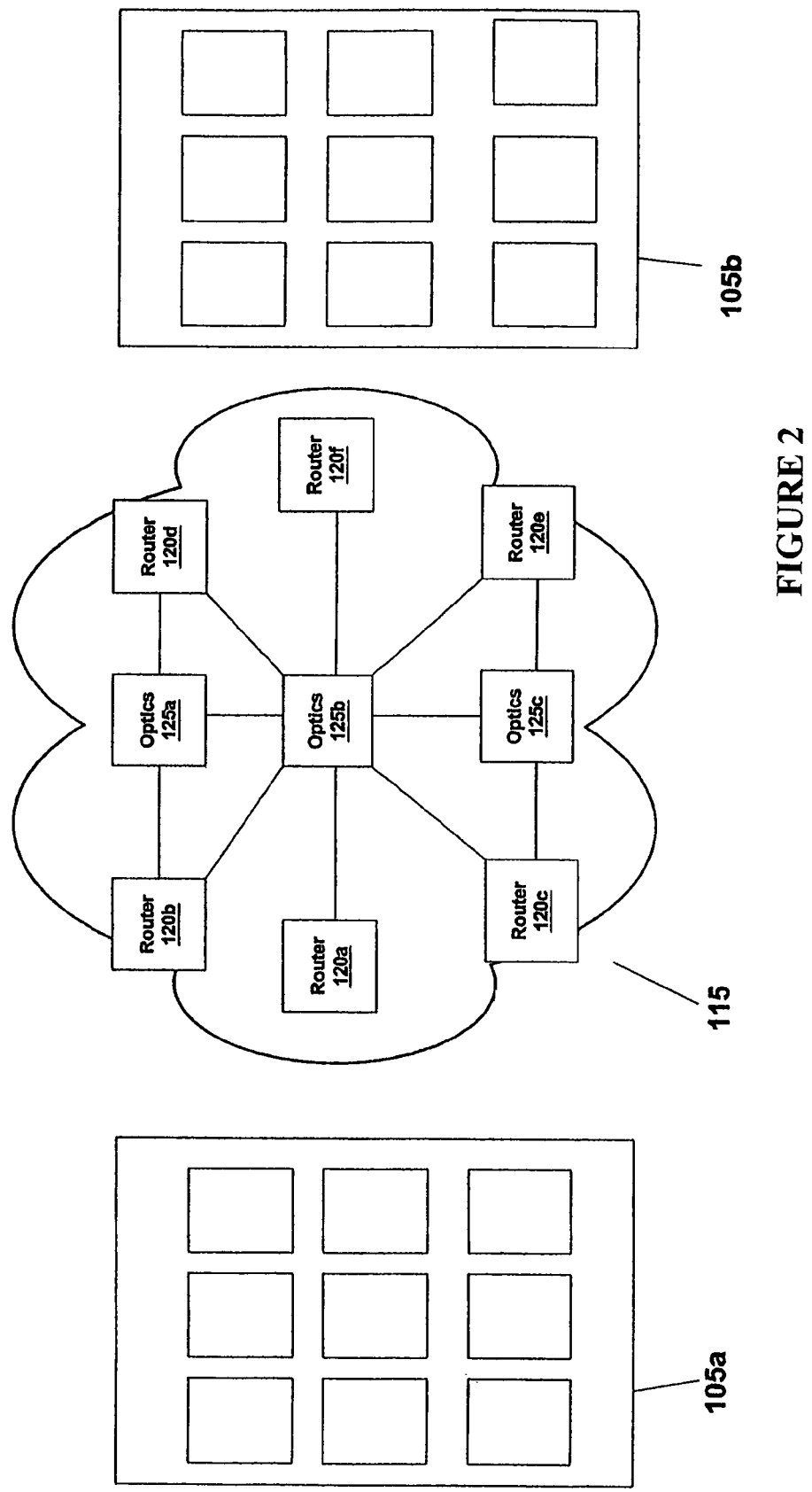
FIG. 2 illustrates a dynamically configurable network system, in accordance with the present invention, that can be optimized for efficient data transfers.

Referring now to FIG. 2, there is illustrated a dynamically configurable network 115 that can be optimized for efficient data transfers. In this embodiment, the two portions of the enterprise are connected to a network 115 that includes a plurality of routers 120 and optical devices 125. (As one skilled in the art can understand, the configuration of the routers 120 and optical device 125 in FIG. 2 is merely exemplary.) Rather than renting a statically defined, dedicated line 110 (shown in FIG. 1), the enterprise can request that a virtual, dedicated line be temporarily provisioned within the network 115. This concept of requesting and providing a virtual, dedicated line on demand may be referred to as "just-in-time provisioning." For example, an enterprise could request, from the network provider, a guaranteed bandwidth of 1.544 Mbps (equivalent to a T1 line) between two points for a period of two days starting in five minutes. Normally, the network provider could not fill such a request because configuring the network to provide such a bandwidth would take significantly longer than five minutes. Moreover, a network provider could not fill such an order because, with present technology, it would not be economically feasible to establish the requested service for such a short period of time. In fact, configuring a path to reserve that amount of bandwidth can take weeks with the present technology.

Using the present invention, however, the network provider could perform just-in-time provisioning and provide enterprises with the requested bandwidth for the requested time frame. Network providers can perform this just-in-time provisioning through a dynamic configuration of the relevant network devices. Assume, for example, that optical device 125$b$ and its associated lines could provide the bandwidth requested by the enterprise. This optical device could be dynamically identified and dynamically configured to reserve the requested bandwidth for the requested timeframe. Moreover, router 120$a$ and router 120$f$ could be dynamically configured to route data from the enterprise to optical device 125$b$ rather than to any other network device and associated path.

In one embodiment of the present invention, the dynamic configuration of network devices is achieved through directory-based networking. One example of directory-based networking is described in commonly owned and assigned patent application no. CNTW-001/00US, entitled System and Method for Configuration, Management and Monitoring of Network Resources, filed on Dec. 6, 2000. Briefly, directory-based networking involves storing a configuration record for each network device in a central repository. When a network device needs to be reconfigured, the centrally-stored configuration record for that device can be retrieved and altered. The altered configuration record can then be used to generate the device-specific code needed to reconfigure the relevant network devices. Finally, once the device-specific code has been generated, that code is provided (either through a push or get) to the appropriate network device(s). Thus, by using directory-based networking, network devices can be dynamically configured with a minimal amount of actual human intervention, thereby allowing for just-in-time provisioning of network resources.

Figure 3:
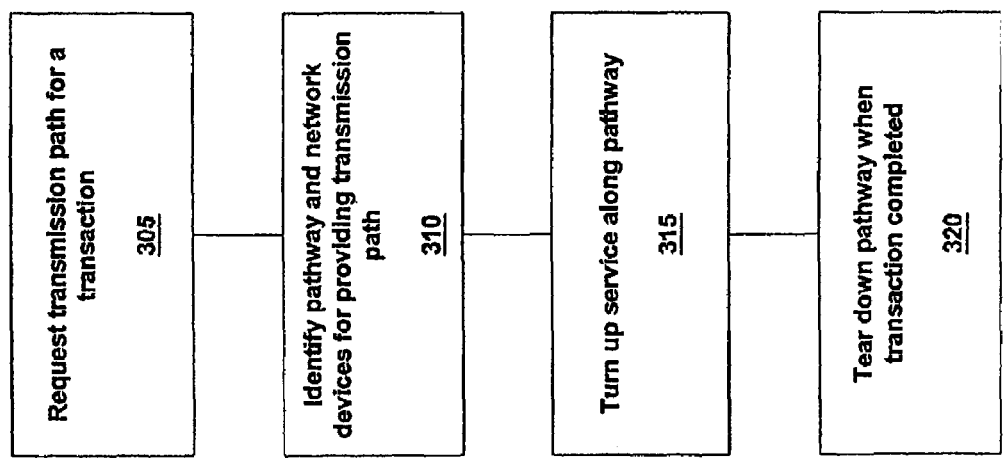
FIG. 3 is a flowchart of the process of bandwidth optimization on a network system such as the one in FIG. 2.

Referring now to FIG. 3, there is illustrated a flowchart of the process of bandwidth optimization on a network system such as the one in FIG. 2. In particular, FIG. 3 describes the process for optimizing the utilization of a fiber optic line or any other type of line. Initially, an enterprise requests a bandwidth of a certain size between two points for a particular timeframe (or for a particular volume of data). Next, a path 305 and the associated network devices that can provide the requested bandwidth are identified 310. The network devices along that path are then configured to provide the requested bandwidth 315. For example, the optical devices along the identified path can be configured to reserve the requested bandwidth for the requesting enterprise. Once the requested timeframe has expired, the optical devices can be returned to a default setting, thereby tearing down the temporary dedicated path 320. The network resources previously dedicated to the enterprise's path are now returned to the pool of network resources where they can be accessed by other enterprises.

Accordingly, one embodiment of the present invention provides a method for just-in-time provisioning of network resources. In particular, this embodiment provides a method for easily and dynamically establishing and tearing down a virtual, dedicated transmission path. With the present invention, enterprises can request and pay for only those network services that they need. Moreover, through the present invention, network providers can better utilize network resources by returning unused network resources to a pool of generally available resources. In prior art systems, these unused network resources could have remained dedicated to a single enterprise whether or not they were actually being used.

Figure 4:
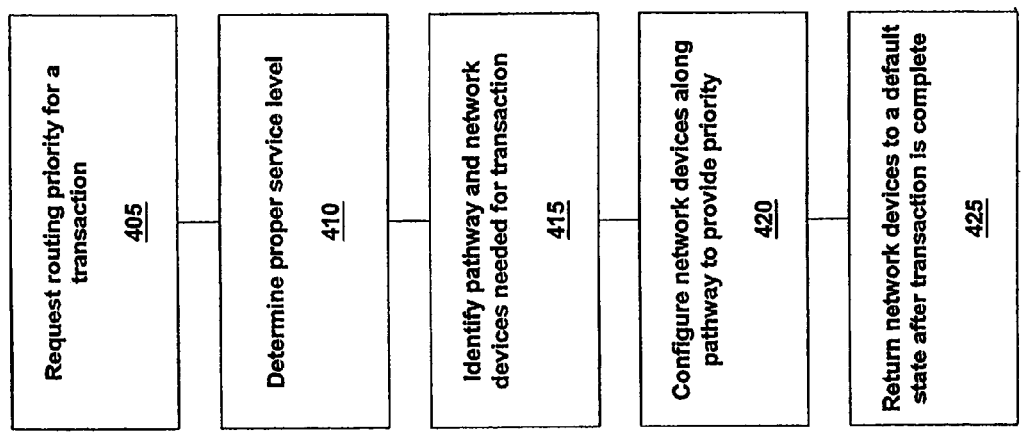
FIG. 4 is a flowchart of the process of routing optimization on a network system such as the one shown in FIG. 2.

Referring now to FIG. 4, there is illustrated a flowchart of the process of routing optimization on a network system such as the one shown in FIG. 2. In this embodiment, routers and similar devices can be optimized to efficiently handle data based upon the priority of the data. As with bandwidth optimization, routing optimization can be enabled by directory-based networking principles that allow for dynamic configuration of network devices. In this particular embodiment, prioritization features of routing devices can be selectively enabled and disabled to route data based upon priority of that data.

Initially, an enterprise may request that data be routed with a high priority or that the enterprise be given a certain routing priority for a particular timeframe 405. In either case, the network provider can determine the enterprise's service level and link that service level to a priority 410. For example, if the enterprise has a top level service agreement, that enterprise may have access to the highest level of priority that the network provider can give. Alternatively, if the enterprise has a lower level service agreement, that enterprise may only have access to a mid-level priority. By tiering priority in this fashion, enterprises can select and pay for the level of service that they need. Moreover, network providers can maximize network resources and revenue by providing higher priority service(s) to those customers that need it and that are willing to pay for it.

Responsive to an enterprise requesting that data be routed with a certain priority, a pathway can be identified 415 and routers along that pathway can be dynamically reconfigured to enable priority data handling features such as weighted fair queuing 420. With these priority data handling features enabled, higher priority data can be routed before lower priority data.

As previously described, weighted fair queuing is effective for routing data based upon priority but can cause network congestion and router failure when used unnecessarily. The present invention addresses this problem by allowing for weighted fair queuing and similar priority data handling features to be dynamically disabled 425. In other words, weighted fair queuing can be turned off when not needed without significant difficulty.

Notably, the present invention allows for the concurrent operation of bandwidth optimization and routing optimization. For example, an enterprise could request a virtual dedicated line and also request routing priority to that line. The network provider could provision these services based upon a service level agreement with the enterprise.

Figure 5:
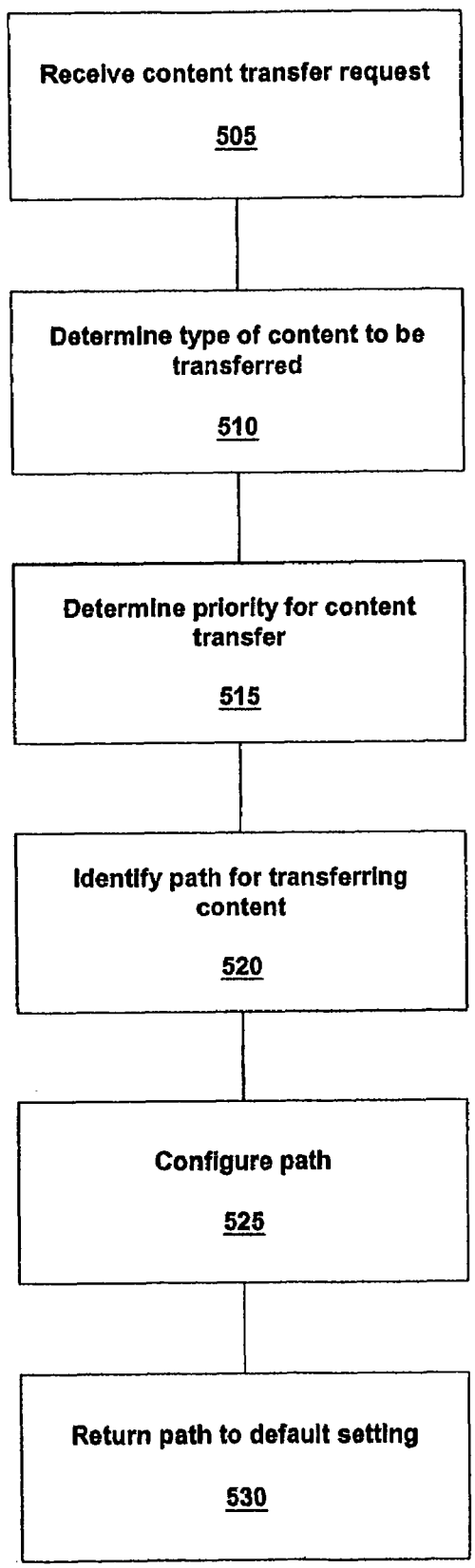
FIG. 5 is a flowchart of the process of content transfer optimization on a network system such as the one shown in FIG. 2.

Referring now to FIG. 5, there is illustrated a flowchart of the process of content transfer optimization on a network system such as the one shown in FIG. 2. In this method, an enterprise can notify its network provider that it has a block of data to be moved between two points within certain quality parameters 505. The quality parameters can be directly indicated, e.g., specified delivery time, or they can be determined according to the type of content being transferred 510. For example, movement of disk mirroring content may take a higher priority than movement of replication content.

After the request for content transfer has been made and the importance of that transfer has been determined 515, the path for transferring that content can be identified 520. If the requesting enterprise is utilizing a virtual dedicated line, the content transfer can be made using that line. Additionally, the routers connected to that line can be configured such that weighted fair queuing is enabled 525 for this content transfer and disabled when the transfer is complete 530. Alternate embodiments involve differing combinations of bandwidth optimization and content optimization. As with bandwidth optimization and routing optimization, content-delivery optimization can be achieved, in a variety of ways, including through the use of directory-enabled networking.

In conclusion, the present system provides, among other things, a system and method for optimizing the utilization of network resources. Those skilled in the art, however, can readily recognize that numerous variations and substitutions may be made in the invention, its use and its configuration to achieve substantially the same results as achieved by the embodiments described herein. Accordingly, there is no intention to limit the invention to the disclosed exemplary forms. May variations, modifications and alternative constructions fall within the scope and spirit of the disclosed invention as expressed in the claims.

What is claimed is:

1. A method for optimizing data transmissions, the method comprising:

receiving a request for bandwidth adjustment between a first point and a second point for a particular length of time;

identifying at least a first network device configurable to assist in providing the requested bandwidth for the requested length of time between the first point and the second point;

retrieving at least a first configuration record from a central repository of configuration records, the first configuration record corresponding to the at least a first network device, wherein the retrieved configuration record includes configuration information about the at least a first network device;

altering the at least a first configuration record retrieved from the central repository of configuration records in accordance with the requested bandwidth;

storing the altered configuration record in the central repository of configuration records;

generating, using the altered configuration record, commands to configure the at least one network device so as to enable the at least one network device to assist in providing the requested bandwidth; and sending the generated commands to the at least a first network device to thereby alter a configuration record stored on the first network device;

wherein the central repository is geographically separated from the first point and the second point.

2. The method of claim 1 including
verifying the request for bandwidth complies with a particular service level agreement in place for a customer requesting the bandwidth.

3. The method of claim 1 including accessing service level agreement information responsive to a completion of the data moving from the first point to the second point, and configuring the identified at least a first network device to disable the requested bandwidth between the first point and the second point as defined by the service level agreement information.

4. The method of claim 1, wherein the identifying includes identifying a plurality of network devices configurable to assist in providing the requested bandwidth, and wherein the retrieving includes retrieving a plurality of configuration records from the central repository of configuration records, each of the plurality of configuration records including information that is unique to a corresponding one of the plurality of network devices.

5. The method of claim 1, wherein the step of identifying at least a first network device comprises the step of:
identifying at least a first optical device.

6. A method for establishing a path between a first data point and a second data point to move data, the method comprising the steps of:
receiving a request to move data between the first point and the second point;
identifying a bandwidth adjustment necessary for complying with the requested data move between the first point and the second point;
identifying at least a first network device configurable to assist in providing the requested data move between the first point and the second point;
retrieving at least a first configuration record, from a central repository, that corresponds to the at least a first network device, wherein the retrieved configuration record includes configuration information about the at least a first network device;
altering the at least a first configuration record in accordance with the requested data move;
generating, using the altered configuration record, device-specific commands for reconfiguring the first network device;
configuring, using the generated device-specific commands, the first network device so as to enable the at least a first network device to assist in the requested data move between the first point and the second point; and
responsive to a predefined event, configuring the identified at least a first network device to disable the established path between the first point and the second points;
wherein the central repository is geographically separated from the first point and the second point.

7. The method of claim 6, wherein the predefined event is a completion of the movement of the data from the first point and the second point.

8. The method of claim 6, wherein identifying the bandwidth includes calculating the bandwidth necessary to move a select volume of data.

9. The method of claim 6, wherein identifying the bandwidth includes receiving a request for a particular data priority.

10. The method of claim 6, wherein the generated device-specific commands are configured to enable the at least a first network device to assist in establishing the path as a loosely defined path.

11. The method of claim 6, wherein the generated device-specific commands are configured to enable the at least a first network device to assist in establishing the path as a strictly defined path.

12. The method of claim 6, wherein the generated device-specific commands are configured to enable the at least a first network device with an awareness of other source locations needing to route traffic to the first network device; and
wherein the generated device-specific commands are configured to enable the at least a first network device with an awareness of other destination locations that it may need to route traffic to.

13. The method of claim 6, wherein the generated device-specific commands are configured to enable the identified at least a first network device with an ability to designate traffic as a predefined type for movement through the network.

14. The method of claim 13, wherein the generated device-specific commands are configured to enable the identified at least a first network device with an ability to designate the traffic as a predefined type in accordance with agreed and defined data types as required for routing through a network.

15. The method of claim 13, wherein the generated device-specific commands are configured to enable the identified at least a first network device with an ability to designate the traffic as a predefined type for movement through the network in fulfillment of conditions in the customer service level agreement.

16. The method of claim 6 wherein the generated device-specific commands are configured to enable the at least a first network device with an ability to filter traffic, wherein the filtering is carried out in accordance with a constraint selected from the group consisting of a predefined traffic priority and fulfillment of a condition in the customer service level agreement.

17. The method of claim 6, wherein the generated device-specific commands are configured to enable the identified at least a first network device with an awareness of predefined policies required for movement through the network in accordance with agreed and defined data designations or in fulfillment of a condition in the customer service level agreement.

18. A system for managing a transmission of data in a network comprising:
a central repository for a plurality of configuration records, wherein each of the plurality of configuration records includes configuration information for a corresponding one of a plurality of network devices in a network; and
a network manager unit communicatively coupled to each of the network devices and to the repository of configuration records wherein the network management unit is configured to:
receive a request for a path between a first point and a second point for the transmission of the data;
identify a collection of the plurality of network devices that are configurable to assist in providing the requested path;
retrieve and alter each of a portion of the plurality of configuration records in accordance with the requested path wherein each of the collection of the plurality of configuration records corresponds to one of the portion of the plurality of network devices;

generate, using the altered configuration records, device-specific commands to configure each of the collection of the plurality of network devices so as to enable the collection of the plurality of network devices to assist in providing the requested path; and send the device-specific commands to each of the collection of the plurality of network devices to thereby alter the configuration of each of the plurality of network devices;

wherein the central repository is geographically separated from the first point and the second point.

19. The system of claim 18 wherein the network manager unit is configured to receive a request to handle the transmission of the data with a particular priority, and wherein the network manager unit is configured to generate, in response to the particular priority complying with a service level agreement that governs the request, the device specific commands so as to enable each of the network devices in the collection of the plurality of network devices to assist the transmission of the data with the particular priority.

20. The system of claim 18 wherein the network manager unit is configured to receive a request for a particular level of bandwidth for the transmission of the data, and wherein the network manager unit is configured to generate, in response to the particular level of bandwidth complying with a service level agreement that governs the request, the device specific commands so as to enable each of the network devices in the collection of the plurality of network devices to assist the transmission of the data with the particular level of bandwidth.

21. The system of claim 18 wherein the network manager unit is configured to receive a request for a particular volume of data for the transmission of the data, and wherein the network manager unit is configured to generate, in response to the particular level of bandwidth complying with a service level agreement that governs the request, the device specific commands so as to enable each of the network devices in the collection of the plurality of network devices to assist the transmission of the data with the particular level of bandwidth.

* * * * *